Aug. 23, 1932.   T. ROBINSON   1,873,041

MOLDING APPARATUS

Original Filed July 10, 1928

INVENTOR
Thomas Robinson
BY
ATTORNEYS

Patented Aug. 23, 1932

1,873,041

UNITED STATES PATENT OFFICE

THOMAS ROBINSON, OF NEW YORK, N. Y., ASSIGNOR TO LANCASTER ASPHALT, INC., OF NEW YORK, N. Y., A CORPORATION OF DELAWARE

MOLDING APPARATUS

Original application filed July 10, 1928, Serial No. 291,638. Divided and this application filed November 23, 1929. Serial No. 409,302.

This invention relates to molding apparatus and is concerned more particularly with molding drums of novel construction which is particularly adapted for the production of roofing elements of the type set forth and described in my Patent No. 1,698,242, issued January 8, 1929. The apparatus of this invention is also useful in the production of roofing elements of the type set forth and described in my co-pending application, Serial No. 291,638, filed July 10, 1928, of which the present application is a division.

In the manufacture of roofing elements in accordance with the method disclosed in the patent, a plastic material capable of hardening is placed between a pair of jacket sheets and the plastic mass jacketed by the sheets is passed between a pair of molding drums having cooperating molding cavities in the faces thereof. The drums exert pressure on the sheets and plastic material and give selected portions of the jacketed mass the shape of the final roofing products which is determined by the shape of the molding cavities. These cavities are provided with knife edges by which the sheets are cut or scored along the outlines of the formed units.

According to the process disclosed in my co-pending application, the material acted on is a composite web made up of plastic material and fibrous material mixed therewith. This sheet, which is of uniform thickness, is introduced between a pair of molding drums with cooperating cavities therein of appropriate shape and the drums exert pressure on the web and form selected portions thereof into final roofing products.

The present invention is concerned with a molding drum for the purpose above described which is of improved construction and capable by simple changes of making many different types of finished products. This drum is so constructed that it has a long life and those parts by which pressure is applied are protected against shock and injury.

The new roofing drum comprises a hollow cylinder which is formed with a plurality of knife edges in its outer surface, these knife edges defining the mold cavities. The bottoms of the cavities are defined by mold plates removably secured in position and supported from beneath by a cushion material which is capable of yielding slightly, under the force of pressure or impact and which protects the plates against injury. Since the plates determine the shape of the final product and these plates can be readily removed from and replaced on the drum, it is apparent that a pair of drums may be used for the production of products of many different forms.

For a better understanding of the invention, reference may be had to the accompanying drawing, in which Fig. 1 is a sectional view diagrammatically illustrating the operation of the molding apparatus;

The drums illustrated are appropriate for the formation of single shingles which have a tapering thickness from one end to the other. Each drum consists of a hollow cylinder 10 which is provided with a plurality of projecting knife edges 11 on its periphery. These knife edges are preferably of triangular section and may be formed as an integral part of the drum itself. The knife edges define the cavities by which the roofing elements are given their final shape and form and the knife edges cooperate to sever the blank which is fed to them along the outlines of the elements or else score the blank to a depth such that the units can be readily removed from it.

Figure 3:
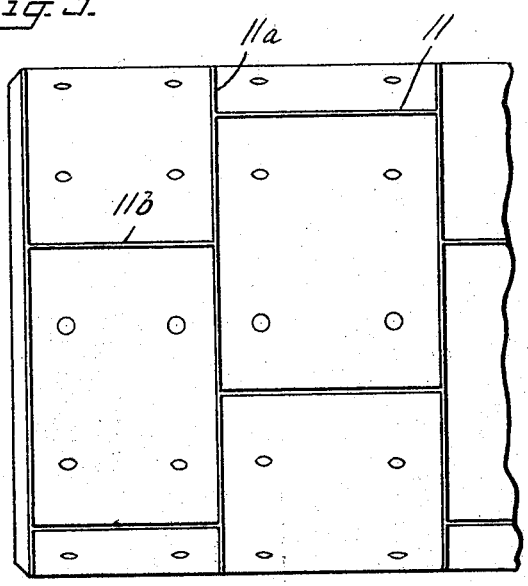
Fig. 3 is a face view of a portion of such a drum.

In the drum illustrated in Fig. 3, there are circumferential knife edges 11a and axial knife edges 11b. Preferably there are a plurality of circumferential knife edges so that the drums may act on a sheet of a width equal to the width of a plurality of shingles, and thus form a number of shingles at one operation. The axial knife edges 11b extend between adjacent circumferential knife edges 11a.

Each mold cavity defined by parts of knife edges 11a and 11b has a bottom defined by a mold plate 12 held in place by bolts 13 which pass through the plates and into threaded openings in the drum wall. These plates have a shape which determines the thickness and shape of the final product. The form illustrated is constructed for the formation of tapered shingles such as that shown at 14, and accordingly each plate 12 has a thin end and a thick end, so that when the blank is passed between a pair of drums, the sheet is reduced in thickness between the thick ends of plates 12, one on each drum, and the thickness of the blank is increased in the space between the thin ends of plates 12, one on each drum.

The blank employed may take various forms, as for example, it may be in the form of a single sheet of plastic material of substantial thickness or of a pair of thin sheets with plastic material between them. The blank is delivered to the drums with the plastic ingredients thereof sufficiently fluent to permit the drums to vary the thickness in the manner described.

The plates 12 which determine the shape of the final product may be readily removed and replaced by others of a different contour so that final products of different kinds may be readily produced. For this purpose the bolts 13 are unscrewed and other plates, appropriate for the purpose, substituted for them.

Beneath the plates, there is a cushioning layer 15 which lies between each plate and the face of the drum. The cushioning layer is preferably of metal and may be zinc, lead, or the like. This cushioning material is preferably placed in position after the plates 12 have been mounted in the cavities and for this purpose, the metal in molten form is introduced through openings 16, through the drum wall. When the metal solidifies the mold plates 12 are supported from beneath by a solid metallic layer which insures that the plate is supported evenly throughout its surface and is thus relieved of strains which might arise from improper setting.

Figure 2:
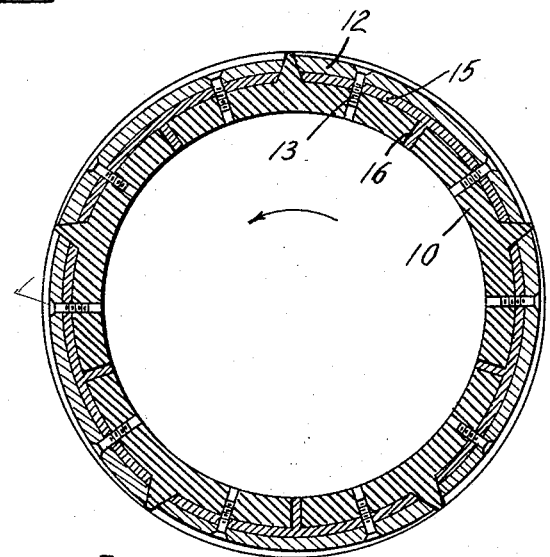
Fig. 2 is a transverse section of a single drum of the invention.
Figure 1:
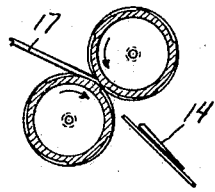

The drums are intended to rotate in the direction indicated by the arrows in Fig. 1 so that as the blank 17 passes between the drums, the thin ends of the elements are first formed and the action of the molding cavities of the drums causes the more fluent portions of the blank to be displaced rearwardly with respect to the direction of movement of the blank through the drums, so that the products are discharged thin end first. When the drums operate in this manner, proper displacement of the blank material is insured and the space defined by a pair of cooperating cavities, one on each drum, is completely filled by blank material so that perfect products are produced.

The drum illustrated is constructed for the production of individual roofing elements of generally rectangular shape but it will be evident that by proper construction of the drum, roofing products of other outlines may be produced. The cross-sectional shape of the products is determined by the molding plates employed and plates of varying types may be used for the production of elements of uniform thickness or of varying tapering thickness. The knife edges on the drums are brought substantially into contact as the drums rotate and serve either to sever the blank material or else to score it along the outlines of the individual products. As the formed blank passes out from between the molding drums, the individual units can be readily broken apart due to the scoring, if they have not been completely severed by the knife edges.

What I claim is:

1. In molding apparatus, a drum having a plurality of mold cavities in its periphery, and a removable plate forming the bottom of each cavity and constituting a part of the mold and a layer of solid, inelastic cushioning material substantially filling the spaces between the said drum and each plate.

2. In molding apparatus, a drum having a plurality of mold cavities in its periphery, a removable plate forming the bottom of each cavity, and a cushion layer between said plate and the drum.

3. In molding apparatus, a drum having mold cavities in its face, a steel plate lying in each cavity and forming the bottom of the mold, and a layer of a relatively soft metal between each plate and the face of the drum.

4. In molding apparatus, a drum comprising a cylinder having its outer face subdivided into a plurality of mold cavities, a plate mounted in each cavity and forming the bottom thereof, and means for securing the plate in position, the plate being curved and of tapering thickness from end to end and a layer of inelastic metallic cushioning material between each of said plates and the drum and adapted uniformly to support on the drum the entire surface of the plate.

5. In molding apparatus, a drum having its surface subdivided into a plurality of mold cavities, a removable plate lying in each cavity and forming the bottom thereof, this plate having a tapering thickness from end to end with its thick end leading in the direction of movement in which the drum is to be rotated, and means for securing the plate to the drum and a cushion of inelastic solid material between each of the said plates and the drum.

6. In a molding apparatus, a drum having its surfaces subdivided into a plurality of molding cavities, a removable plate lying in each cavity, said plates having their upper surfaces shaped to conform to articles to be molded, and a yieldable, inelastic cushion between each of said plates and said drum.

7. In a molding apparatus, a drum having its surface subdivided into a plurality of molding cavities, a removable plate lying in each cavity, said plates having their upper surfaces shaped to conform to articles to be molded, and a yieldable cushion of a relatively soft inelastic metal between each of said plates and said drum.

8. A molding device comprising a hollow molding drum having a plurality of molding cavities in the outer surface thereof and openings extending from said cavities to the inner surface thereof, a plate overlying the bottom of each cavity, bolts securing said plates to said drum, and a layer of lead between each plate and the drum and filling said openings.

9. A molding device comprising a molding drum having molding cavities therein and openings extending from the bottoms of said cavities, plates overlying the bottoms of said cavities, means for securing the plates in place, and a cushion of soft inelastic metal between said plates and drum.

10. In molding apparatus for producing roofing elements and the like, a drum having a plurality of mold cavities in its periphery, a removable plate forming the bottom of each cavity and constituting a part of the mold, a knife edge defining each cavity, and a layer of solid cushioning material between the said plate and the drum.

11. In molding apparatus for producing roofing elements and the like, a drum having circumferential knife edges on its outer surface, a plurality of axially-disposed knife edges on the drum surface disposed between adjacent circumferential knife edges and out of alignment with those axially-disposed knife edges on the opposite side of each of the adjacent circumferential knife edges, the respective knife edges forming a plurality of mold cavities in the drum periphery, an adjustable removable plate forming the bottom of each cavity, and a cushioning layer of solid material separating the said plate and the drum.

12. In molding apparatus for producing roofing elements and the like, a drum having a plurality of circumferential knife edges on its outer face, a row of knife edges lying between adjacent circumferential knife edges and disposed at an angle thereto, a plate secured to the face of the drum and lying in the space defined by a pair of contiguous circumferential knife edges and by a pair of contiguous knife edges arranged at an angle thereto, and a cushion of inelastic yieldable material between the said plate and the drum.

In testimony whereof I affix my signature.

THOMAS ROBINSON.